United States Patent
Benisty et al.

(10) Patent No.: US 11,372,543 B2
(45) Date of Patent: Jun. 28, 2022

(54) ZONE-APPEND COMMAND SCHEDULING BASED ON ZONE STATE

(71) Applicant: Western Digital Technologies, Inc., San Jose, CA (US)

(72) Inventors: Shay Benisty, Beer Sheva (IL); Alexander Bazarsky, Holon (IL); Judah Gamliel Hahn, Ofra (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/845,685

(22) Filed: Apr. 10, 2020

(65) Prior Publication Data
US 2021/0318801 A1 Oct. 14, 2021

(51) Int. Cl.
*G06F 3/06* (2006.01)

(52) U.S. Cl.
CPC .......... *G06F 3/0604* (2013.01); *G06F 3/0631* (2013.01); *G06F 3/0659* (2013.01); *G06F 3/0679* (2013.01)

(58) Field of Classification Search
CPC .... G06F 3/0604; G06F 3/0679; G06F 3/0659; G06F 3/0631; G06F 3/0644; G06F 3/0688; G06F 3/0616
See application file for complete search history.

(56) References Cited

U.S. PATENT DOCUMENTS

| 10,387,081 B2 | 8/2019 | Benisty | |
| 10,417,190 B1* | 9/2019 | Donlan | G06F 16/10 |
| 2009/0031073 A1* | 1/2009 | Diggs | G06F 3/0607 711/103 |
| 2017/0123928 A1 | 5/2017 | Smith et al. | |
| 2018/0341410 A1* | 11/2018 | Benisty | G06F 3/0688 |
| 2019/0095123 A1* | 3/2019 | Lin | G06F 3/061 |
| 2019/0107961 A1* | 4/2019 | Lee | G06F 3/0679 |

(Continued)

FOREIGN PATENT DOCUMENTS

WO 2018158654 A1 9/2018

OTHER PUBLICATIONS

International Search Report and the Written Opinion for International Application No. PCT/US2020/064595 dated Mar. 25, 2021, 9 pages.

(Continued)

*Primary Examiner* — Charles Rones
*Assistant Examiner* — Tong B. Vo
(74) *Attorney, Agent, or Firm* — Patterson + Sheridan, LLP; Steven H. VerSteeg (57) ABSTRACT

The present disclosure generally relates to scheduling zone-append commands for a zoned namespace (ZNS). Rather than taking zone-append commands in order or randomly, the zone-append commands can be scheduled in the most efficient manner consistent with the open zones of the ZNS. A zone priority is determined based upon the length of time that a zone has been open together with the zone status. Generally, the older the zone and/or the more full that a zone is increases the priority. Once the zone priority is established, the zone-append commands are scheduled to ensure the zone-append commands for the high priority zones are processed first so that the open zone can be filled prior to closing.

18 Claims, 6 Drawing Sheets

(56) References Cited

U.S. PATENT DOCUMENTS

| | | | | |
|---|---|---|---|---|
| 2019/0146875 A1* | 5/2019 | Harrington | ......... | G06F 11/1092 |
| | | | | 714/6.24 |
| 2019/0172490 A1* | 6/2019 | Cai | ...................... | G06F 3/0604 |
| 2019/0361772 A1* | 11/2019 | Koltsidas | ................ | G06F 3/064 |
| 2019/0384525 A1* | 12/2019 | Danilov | ................ | G06F 3/0604 |
| 2020/0089407 A1 | 3/2020 | Baca et al. | | |
| 2020/0225881 A1* | 7/2020 | Baptist | ................. | G06F 3/0635 |
| 2021/0019083 A1* | 1/2021 | Guo | ................... | G06F 11/1076 |
| 2021/0026547 A1* | 1/2021 | Peh | ....................... | G06F 3/0688 |
| 2021/0109856 A1* | 4/2021 | Lee | ..................... | G06F 12/0246 |
| 2021/0223994 A1* | 7/2021 | Kanno | ................. | G06F 3/0653 |
| 2021/0232331 A1* | 7/2021 | Kannan | ................ | G06F 3/0631 |

OTHER PUBLICATIONS

Bjorling "Zone Append: A New Way of Writing to Zoned Storage," [retrieved on Mar. 27, 2020]. Retrieved from <https://web.archive.org/web/20200327042346/https://www.usenix.org/sites/default/files/conference/protected-files/vault20_slides_bjorling.pdf>.

Liu, Wen-Guo et al.; "ROCO: Using a Solid State Drive Cache to Improve the Performance of a Host-Aware Shingled Magnetic Recording Drive" Journel of Computer Science and Technology, vol. 34, No. 1, Jan. 2019, pp. 61-76.

Wu, Fenggang et al.: "Performance Evaluation of Host Aware Shingled Magnetic Recording (HA-SMR) Drives" IEEE Transactions on Computers, vol. 66, No. 11, Nov. 2017, pp. 1932-1943.

Xie, Xuchao et al.; "ZoneTier: A Zone-based Storage Tiering and Caching Co-design to Integrate SSDs with SMR Drives"; ACM Transactions on Storage, vol. 15, No. 3, Article 19, Jul. 19 (25 pages).

Xie, Xuchao et al.; "SMRC: An Endurable SSD Cache for Host Aware Shingled Magnetic Recording Drives" IEEE Access, vol. 6, 2018, pp. 20916-20928.

* cited by examiner

ZONE-APPEND COMMAND SCHEDULING BASED ON ZONE STATE

BACKGROUND OF THE DISCLOSURE

Field of the Disclosure

Embodiments of the present disclosure generally relates to scheduling zone-append commands for a zoned namespace (ZNS).

Description of the Related Art

Zoned namespaces (ZNS) are a new direction in storage in which the data storage device restricts writes to sequential zones. ZNS is intended to reduce device side write amplification and overprovisioning by aligning host write patterns with internal device geometry and reducing the need for device side writes that are not directly linked to a host write.

ZNS offers many benefits including: reduced cost due to minimal DRAM requirements per SSD (Solid State Drive); potential savings due to decreased need for overprovisioning of NAND media; better SSD lifetime by reducing write amplification; dramatically reduced latency; significantly improved throughput; and a standardized interface that enables a strong software and hardware exo-system.

In a ZNS environment, multiple zones can be open simultaneously. In general, the more open zones, the more complex the design. Having a large number of open zones in parallel complicates the implementation. One example is XOR management. Each open zone has a dedicated XOR buffer and thus, having many open zones requires more XOR buffers that usually cannot be stored in SRAM. Storage devices need to fold the buffers into DRAM and NAND in some scenarios, which complicates the design and decreases the performance.

Therefore, there is a need in the art for a ZNS device with more efficient management of open zones.

SUMMARY OF THE DISCLOSURE

The present disclosure generally relates to scheduling zone-append commands for a zoned namespace (ZNS). Rather than taking zone-append commands in order or randomly, the zone-append commands can be scheduled in the most efficient manner consistent with the open zones of the ZNS. A zone priority is determined based upon the length of time that a zone has been open together with the zone status. Generally, the older the zone and/or the more full that a zone is increases the priority. Once the zone priority is established, the zone-append commands are scheduled to ensure the zone-append commands for the high priority zones are processed first so that the open zone can be filled prior to closing.

In one embodiment, a data storage device comprises: a memory device; and a controller coupled to the memory device, wherein the controller is configured to: determine a status of at least one zone in a zone namespace (ZNS) environment; determine an age of the at least one zone in the ZNS environment; calculate a priority for the at least one zone based upon the determined status and the determined age; and process zone-append commands based upon the calculated priority.

In another embodiment, a data storage device comprises: a memory device; and a controller coupled to the memory device, wherein the controller comprises: a command fetcher; a command executor; a flash interface module coupled to the memory device; and a zone-append command scheduler coupled to the command fetcher, the command executor, and the flash interface module.

In another embodiment, a data storage device comprises: a memory device; a controller coupled to the memory device; and means to schedule zone-append commands based upon an age of open zones and a fullness of open zones in a zone namespace (ZNS) environment.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to scheduling zone-append commands for a zoned namespace (ZNS). Rather than taking zone-append commands in order or randomly, the zone-append commands can be scheduled in the most efficient manner consistent with the open zones of the ZNS. A zone priority is determined based upon the length of time that a zone has been open together with the zone status. Generally, the older the zone and/or the more full that a zone is increases the priority. Once the zone priority is established, the zone-append commands are scheduled to ensure the zone-append commands for the high priority zones are processed first so that the open zone can be filled prior to closing.

Figure 1:
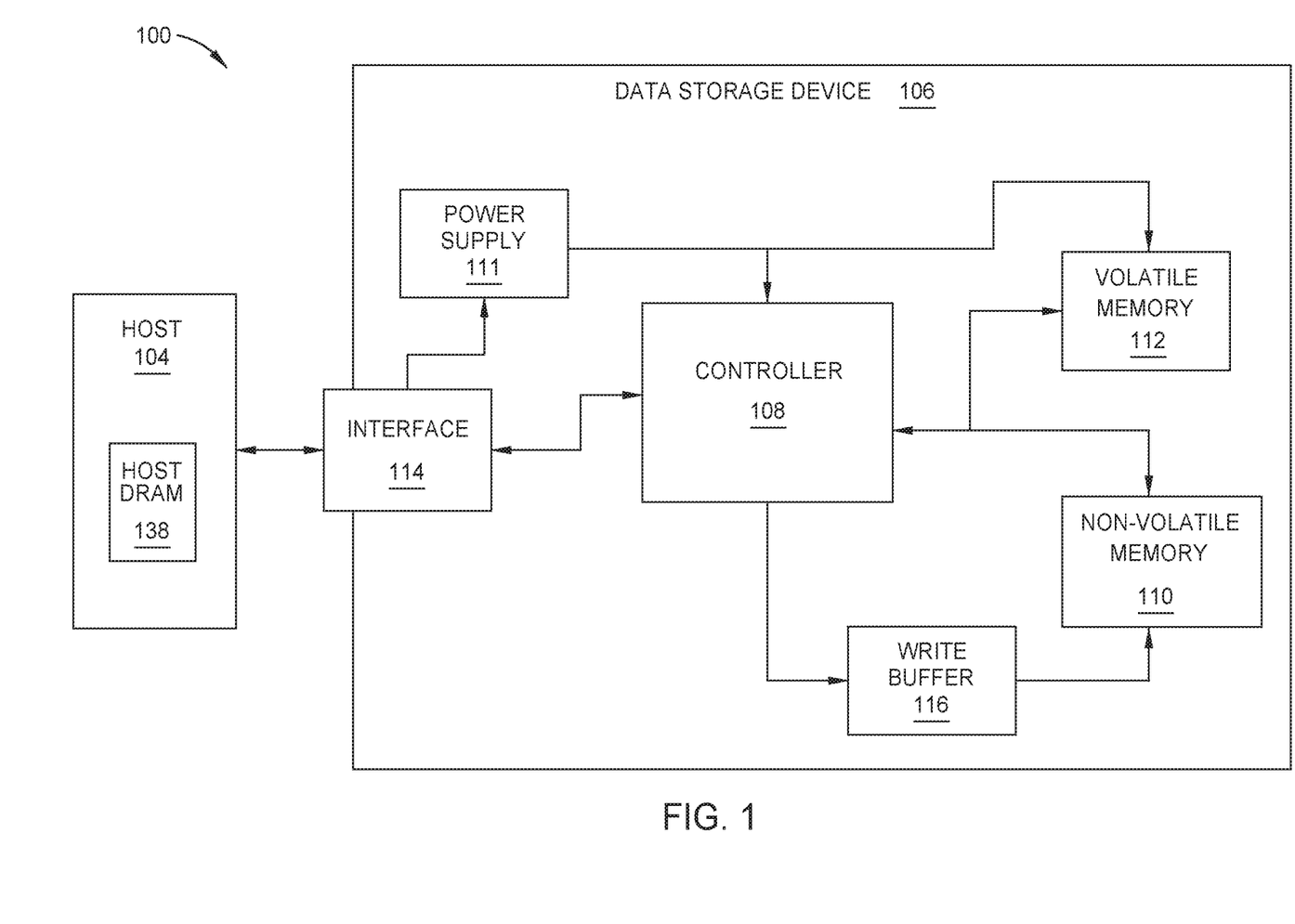
FIG. 1 is a schematic block diagram illustrating a storage system having a storage device that may function as a storage device for a host device, in accordance with one or more techniques of this disclosure.

FIG. 1 is a schematic block diagram illustrating a storage system 100 in which data storage device 106 may function as a storage device for a host device 104, in accordance with one or more techniques of this disclosure. For instance, the host device 104 may utilize NVM 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The storage system 100 includes a host device 104 which may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like.

The data storage device 106 includes a controller 108, non-volatile memory 110 (NVM 110), a power supply 111, volatile memory 112, an interface 114, and a write buffer 116. In some examples, the data storage device 106 may include additional components not shown in FIG. 1 for sake of clarity. For example, the data storage device 106 may include a printed circuit board (PCB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered) to a motherboard of the host device 104.

The interface 114 of the data storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. The electrical connection of the interface 114 (e.g., the data bus, the control bus, or both) is electrically connected to the controller 108, providing electrical connection between the host device 104 and the controller 108, allowing data to be exchanged between the host device 104 and the controller 108. In some examples, the electrical connection of the interface 114 may also permit the data storage device 106 to receive power from the host device 104. For example, as illustrated in FIG. 1, the power supply 111 may receive power from the host device 104 via the interface 114.

The data storage device 106 includes NVM 110, which may include a plurality of memory devices or memory units. NVM 110 may be configured to store and/or retrieve data. For instance, a memory unit of NVM 110 may receive data and a message from the controller 108 that instructs the memory unit to store the data. Similarly, the memory unit of NVM 110 may receive a message from the controller 108 that instructs the memory unit to retrieve data. In some examples, each of the memory units may be referred to as a die. In some examples, a single physical chip may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 110 may comprise a plurality of flash memory devices or memory units. Flash memory devices may include NAND or NOR based flash memory devices, and may store data based on a charge contained in a floating gate of a transistor for each flash memory cell. In NAND flash memory devices, the flash memory device may be divided into a plurality of blocks which may be divided into a plurality of pages. Each block of the plurality of blocks within a particular memory device may include a plurality of NAND cells. Rows of NAND cells may be electrically connected using a word line to define a page of a plurality of pages. Respective cells in each of the plurality of pages may be electrically connected to respective bit lines. Furthermore, NAND flash memory devices may be 2D or 3D devices, and may be single level cell (SLC), multi-level cell (MLC), triple level cell (TLC), or quad level cell (QLC). The controller 108 may write data to and read data from NAND flash memory devices at the page level and erase data from NAND flash memory devices at the block level.

The data storage device 106 includes a power supply 111, which may provide power to one or more components of the data storage device 106. When operating in a standard mode, the power supply 111 may provide power to the one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The data storage device 106 also includes volatile memory 112, which may be used by controller 108 to store information. Volatile memory 112 may be comprised of one or more volatile memory devices. In some examples, the controller 108 may use volatile memory 112 as a cache. For instance, the controller 108 may store cached information in volatile memory 112 until cached information is written to non-volatile memory 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

The data storage device 106 includes a controller 108, which may manage one or more operations of the data storage device 106. For instance, the controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic to the NVM 110. In some embodiments, when the data storage device 106 receives a write command from the host device 104, the controller 108 temporarily stores the data associated with the write command in the internal memory or write buffer 116 before sending the data to the NVM 110.

Figure 2A:
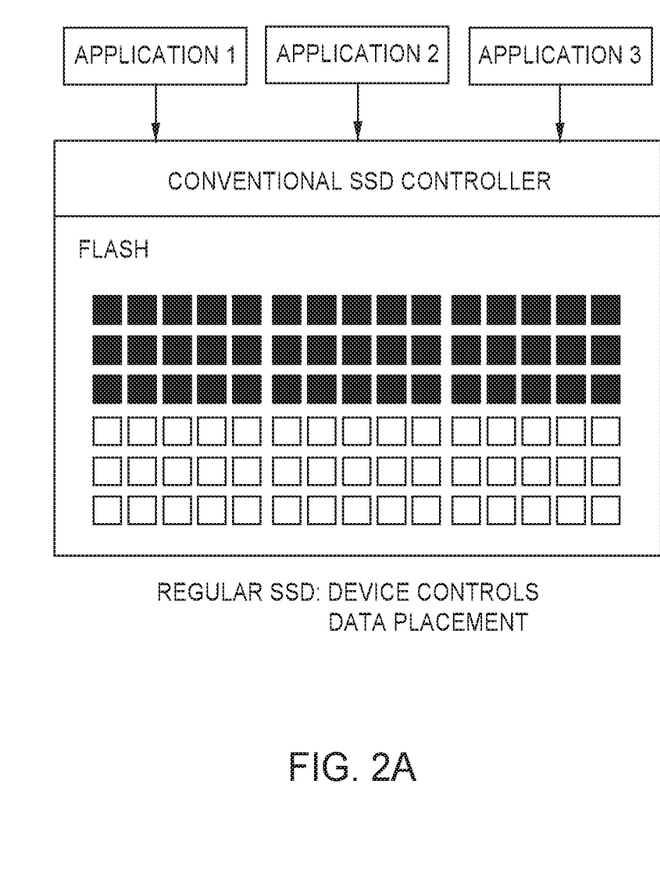
FIG. 2A is a schematic illustration of device control of a traditional SSD.
Figure 2B:
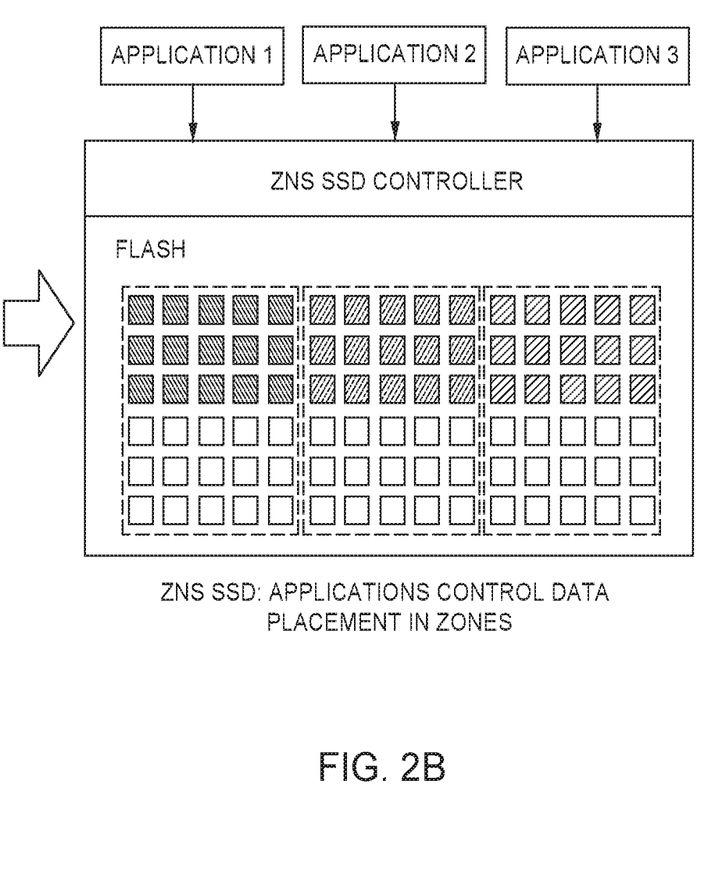
FIG. 2B is a schematic illustration of device control of a ZNS SSD according to an embodiment.

FIGS. 2A and 2B are schematic illustrations of device control of a SSD, according to various embodiments. In one embodiment, the flash device of FIG. 2A and FIG. 2B may be the NVM 110 of the data storage device 106 of FIG. 1. Furthermore, according to various embodiments, the flash device of FIG. 2A and FIG. 2B may be a multi-level cell, such as SLC, MLC, TLC, QLC, or any other iteration of multi-level cell not listed. Each square of the block storage device of FIG. 2A and FIG. 2B represents a block available for data storage. A shaded square or block denotes that the block comprises data. The data may be user data, XOR or parity data, device metadata, or any other suitable data to be stored in the flash of the SSD.

FIG. 2A is a schematic illustration of device control of a traditional SSD. The SSD receives data from multiple applications, such as Application 1, Application 2, and Application 3. The data is stored in the flash of the SSD. In the SSD, the storage device controls the data placement. Data is written sequentially to the flash so that the data from each application may be written in the order that the data is received. Because the data from each application may be random throughout the sequential writes, the latency may be increased and the throughput may be hindered.

FIG. 2B is a schematic illustration of device control of a ZNS SSD. Similar to FIG. 2A, the SSD receives data from multiple applications, such as Application 1, Application 2, and Application 3. The data is stored in the flash of the SSD. In the SSD, the applications or the host, such as the host device 104 of FIG. 1, controls the data placement in the zones. The flash of the SSD is partitioned into various equal capacity zones. The zones may be considered parallel units, in which the host device 104 may direct workloads or data to a specific parallel unit (i.e., the host has block access of the flash). For example, the data associated with Application 1 is located in a first zone, while the data associated with Application 2 is located in a second zone and the data associated with Application 3 is located in a third zone. Due to the zone provisioning, the latency is reduced from the latency of the traditional SSD device control and the throughput is improved from the throughput of the traditional SSD device control.

Figures 3, 4:
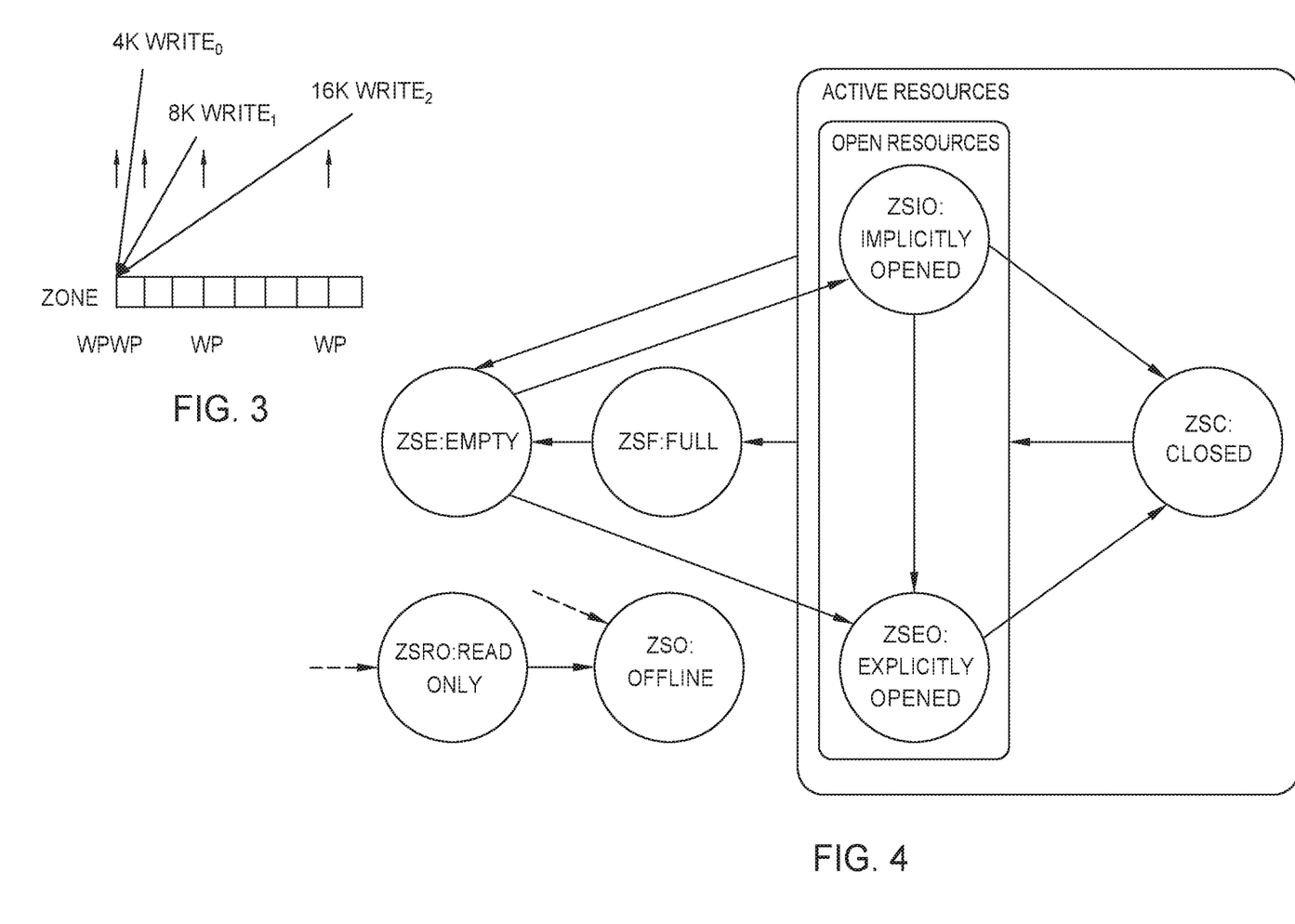
FIG. 3 is a schematic illustration of a zone-append command.
FIG. 4 is a schematic illustration of a state diagram for a ZNS SSD according to one embodiment.

FIG. 3 is a schematic illustration of a zone-append command. The host, such as the host device 104 of FIG. 1, opens the zone implicitly or explicitly. The host device 104 issues several zone-append commands to the same address. Storage device, such as the data storage device 106 of FIG. 1, is responsible for populating the data from the host device 104 and notifying the host device 104 where exactly the data is written within the zone for each command. The location of the data written to the NVM, such as the NVM 110 of FIG. 1, is stored within a logical to physical (L2P) table in the volatile memory, such as the volatile memory 112 of FIG. 1, and the NVM 110. The L2P table comprises pointers to one or more logical block addresses (LBAs) storing data, such as user data.

As illustrated in FIG. 3, each block in the zone is a 4 K size. The term "block" is utilized for exemplary purposes and is not constrained to a 4 K size. Three write commands (i.e., three zone-append commands) are received by the data storage device 106 in the order of a 4 K $Write_0$, an 8 K $Write_1$, and a 16 K $Write_2$. Furthermore, a write pointer (WP) of a zone corresponds to the next available location for a write command. In FIG. 3, the 4 K $Write_0$ is written to the first block and the new write pointer location is at the start of the second block (i.e., at the 4 K size location in the zone). After the $Write_0$ is written to the first block, the 8 K $Write_1$ is written to the next available blocks, occupying the next two blocks (i.e., two 4 K size blocks). The write pointer is updated to reflect the 16 K size location of the zone for the next write command. The last 16 K $Write_2$ command is written to the next four blocks (i.e., four 4 K size blocks). The write pointer is updated to reflect a total zone size of 28 K, where the next write command will be written to the 28 K size location. At each location, the L2P table is updated with the relevant pointer pointing to each block or each write command. Though exemplified in the order above, the write commands received at the same time may be written sequentially in any order (i.e., out of order), such that $Write_2$ may be written prior to $Write_0$, in the zone due to the ZNS environment.

FIG. 4 is a schematic illustration of a state diagram for a ZNS SSD according to one embodiment. In FIG. 4, the various zone states (ZS) are empty (i.e., ZSE:Empty), implicitly opened (i.e., ZSIO:Implicitly Opened), explicitly opened (i.e., ZSEO:Explicitly Opened), closed (i.e., ZSC: Closed), full (i.e., ZSF:Full), read only (i.e., ZSRO:Read Only), and offline (i.e., ZSO:Offline). A generic flow path for a zone may be from an empty state to an open state, which may be either implicitly opened or explicitly opened. From an open state, the zone may be at capacity so that the ZNS is full. After the full state, the zone contents may be erased, which resets the ZNS to empty.

The initial state for each zone after a controller, such as the controller 108 of FIG. 1, power-on or reset event is determined by the zone characteristics of each zone. For example, the zone state, ZSE:Empty, is denoted by a valid write pointer (WP) that points to the lowest LBA (i.e., zone start LBA) in the zone. The zone state, ZSC:Closed, is denote by a WP that does not point to the lowest LBA in the zone. The zone state, ZSF:Full, is the initial state if the most recent zone condition was full. The zone state, ZSRO:Read Only, is the initial state if the most recent zone condition was read only. The zone state, ZSO:Offline, is the initial state if the most recent zone condition was offline.

The zones may have any total capacity or total size, such as 256 MiB or 512 MiB. However, a small portion of each zone may be inaccessible to write data to, but may still be read, such as a portion of each zone storing the XOR data, metadata, and one or more excluded erase blocks. For example, if the total capacity of a zone is 512 MiB, the zone capacity (ZCAP) may be 470 MiB, which is the capacity available to write data to, while 42 MiB are unavailable to write data. The ZCAP of a zone is equal to or less than the total zone storage capacity or total zone storage size. The storage device, such as the data storage device 106 of FIG. 1 or the SSD of FIG. 2B, may determine the ZCAP of each zone upon zone reset. For example, the controller, such as the controller 108 of FIG. 1, may determine the ZCAP of each zone. The storage device may determine the ZCAP of a zone when the zone is reset.

When a zone is empty (i.e., ZSE:Empty), the zone is free of data (i.e., none of the erase blocks in the zone are currently storing data) and the write pointer (WP) is at the zone start LBA (ZSLBA) (i.e., WP=0). The ZSLBA refers to the start of a zone (i.e., the first NAND location of a zone). The write pointer signifies the location of the data write in a zone of the storage device. An empty zone switches to an open and active zone once a write is scheduled to the zone or if the zone open command is issued by the host (i.e., ZSIO:Implicitly Opened or ZSEO:Explicitly Opened). Zone management (ZM) commands can be used to move a zone between zone open and zone closed states, which are both active states. If a zone is active, the zone comprises open blocks that may be written to, and the host may be provided a description of recommended time in the active state. The controller 108 comprises the ZM (not shown). Zone metadata may be stored in the ZM and/or the controller 108.

The term "written to" includes programming user data on 0 or more NAND locations in an erase block and/or partially filled NAND locations in an erase block when user data has not filled all of the available NAND locations. A NAND location may be a flash location, as referred to in FIGS. 2A and 2B. The term "written to" may further include moving a zone to full (i.e., ZSF:Full) due to internal drive handling needs (open block data retention concerns because the bits in error accumulate more quickly on open erase blocks), the data storage device 106 closing or filling a zone due to resource constraints, like too many open zones to track or discovered defect state, among others, or a host device, such as the host device 104 of FIG. 1, closing the zone for concerns such as there being no more data to send the drive, computer shutdown, error handling on the host, limited host resources for tracking, among others.

The active zones may be either open (i.e., ZSIO:Implicitly Opened or ZSEO:Explicitly Opened) or closed (i.e., ZSC: Closed). An open zone is an empty or partially full zone that is ready to be written to and has resources currently allocated. The data received from the host device with a write command or zone append command may be programmed to an open erase block that is not currently filled with prior data. A closed zone is an empty or partially full zone that is not currently receiving writes from the host in an ongoing basis. The movement of a zone from an open state to a closed state allows the controller 108 to reallocate resources to other tasks. These tasks may include, but are not limited to, other zones that are open, other conventional non-zone regions, or other controller needs.

In both the open and closed zones, the write pointer is pointing to a place in the zone somewhere between the ZSLBA and the end of the last LBA of the zone (i.e., WP>0). Active zones may switch between the open and closed states per designation by the ZM, or if a write is scheduled to the zone. Additionally, the ZM may reset an active zone to clear or erase the data stored in the zone such that the zone switches back to an empty zone. Once an active zone is full, the zone switches to the full state. A full zone is one that is completely filled with data, and has no more available blocks to write data to (i.e., WP=zone capacity (ZCAP)). In a full zone, the write pointer points to the end of the writable capacity of the zone. Read commands of data stored in full zones may still be executed.

The ZM may reset a full zone (i.e., ZSF:Full), scheduling an erasure of the data stored in the zone such that the zone switches back to an empty zone (i.e., ZSE:Empty). When a full zone is reset, the zone may not be immediately cleared of data, though the zone may be marked as an empty zone ready to be written to. However, the reset zone must be erased prior to switching to an open and active zone. A zone may be erased any time between a ZM reset and a ZM open. Upon resetting a zone, the data storage device 106 may determine a new ZCAP of the reset zone and update the Writable ZCAP attribute in the zone metadata. An offline zone is a zone that is unavailable to write data to. An offline zone may be in the full state, the empty state, or in a partially full state without being active.

Since resetting a zone clears or schedules an erasure of all data stored in the zone, the need for garbage collection of individual erase blocks is eliminated, improving the overall garbage collection process of the data storage device 106. The data storage device 106 may mark one or more erase blocks for erasure. When a new zone is going to be formed and the data storage device 106 anticipates a ZM open, the one or more erase blocks marked for erasure may then be erased. The data storage device 106 may further decide and create the physical backing of the zone upon erase of the erase blocks. Thus, once the new zone is opened and erase blocks are being selected to form the zone, the erase blocks will have been erased. Moreover, each time a zone is reset, a new order for the LBAs and the write pointer for the zone may be selected, enabling the zone to be tolerant to receive commands out of sequential order. The write pointer may optionally be turned off such that a command may be written to whatever starting LBA is indicated for the command.

The controller 108 provides a $T_{ZoneActiveLimit}$ (ZAL) value per zone. The ZAL may also be applicable to blocks and/or streams, in various embodiments. Each zone is assigned a ZAL value, which the ZAL value represents the time that the open zone may remain open. In standard storage devices, the ZAL value is fixed throughout the time that the relevant zone is in usage by the host device 104 (i.e., the storage device receives write or read commands from the host for the relevant zone). The ZAL value is shared by each zone of the namespace (i.e., a global ZAL value). The time that that ZAL value corresponds to is a maximum value of time before an unacceptable amount of bit errors have accumulated in a zone. The host device 104 or the data storage device 106 may close the zone prior to reaching the ZAL value to avoid the unacceptable amount of bit errors accumulated.

If the zone active limit is a non-zero value, the controller may transition a zone in either ZSIO:Implicitly Opened, ZSEO:Explicitly Opened or ZSC:Closed state to the ZSF: Full state. When a zone is transitioned to the ZSIO:Implicitly Opened state or ZSEO:Explicitly Opened state, an internal timer in seconds starts so that the host device 104 or the data storage device 106 recognizes when the ZAL value is exceeded. If the ZAL value or time limit is exceeded, the controller 108 may either warn the host device 104 that the zone requires finishing (i.e., the zone needs to be at capacity) or transition the zone to the ZSF:Full state. When the host device 104 is warned that the zone requires finishing, the zone finish recommended field is set to 1 and the zone information changed event is reported to the host device 104. When the zone is transitioned to the ZSF:Full state, the zone finished by controller field is set to 1 and the zone information changed event is reported to the host device 104. Because the ZAL value is a global parameter for each zone of the storage device, a zone may be closed prematurely allowing for less than optimal storage drive operation or be closed late allowing for an unacceptable amount of bit errors to accumulate, which may result in a decreased integrity of the data storage device. The unacceptable accumulation of bit errors may also result in a decreased performance of the data storage device. The global ZAL parameter is a static parameter and may be based on a worst-case estimate of the conditions that a host may face.

Figure 5:
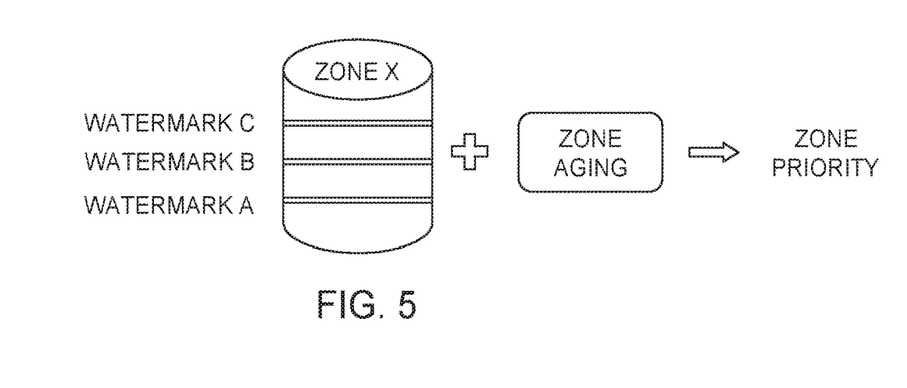
FIG. 5 is a schematic illustration of zone-append scheduling according to one embodiment.

FIG. 5 is a schematic illustration of zone-append scheduling according to one embodiment. Each open zone of the storage device, such as the data storage device 106 of FIG. 1, is monitored by a controller, such as the controller 108 of FIG. 1. The controller 108 may apply a zone priority value on each zone based on the state of the zone, which includes, but not limited to, the amount of data available in the zone, the zone health (i.e., zone cycling), and the remaining time an open zone may have before reaching the ZAL, as described in FIG. 4. Each zone-append command is scheduled based on the zone priority so that a zone that is reaching the criteria for zone closure may be written to first, thus effectively filling the zone, without pad or dummy data, to capacity.

In FIG. 5, a zone X has a certain capacity as illustrated by the cylinder, where the volume of the cylinder is a representation of the effective capacity (i.e., total capacity–space lost to metadata and overhead) of the zone. For example, if the effective capacity (the amount of data available in the zone) of the zone X (i.e., the cylinder) is 300 MiB, then 300 MiB of user data may be written to the zone X. Furthermore, the controller 108 may have firmware to determine how filled a certain zone may be by utilizing watermarks, such as Watermark A, Watermark B, and Watermark C. A zone may have one or more watermarks associated with the capacity, where more watermarks allow for greater accuracy in determining the current volume of data in a zone. For example, the Watermark A refers to a zone filled to a fourth of the total capacity (i.e., 75 MiB) with data, the Watermark B refers to a zone filled to half of the total capacity (i.e., 150 MiB), and the Watermark C refers to a zone filled to three-fourths of the total capacity (i.e., 225 MiB).

Furthermore, zone X is associated with a zone age, where the zone age refers to the amount of time that a zone is in an active and open state as described in FIG. 4. A zone with a higher zone age (i.e., an older zone) is more susceptible to bit error accumulation and has a smaller difference between the current age of the zone and the ZAL of the zone than that of a zone with a lower zone age. By associating both the age of a zone and the amount of data available to be written to in a zone, a zone priority schedule (i.e., which zone to write data to) may be utilized to effectively manage the open zones in a storage device.

Figure 6:
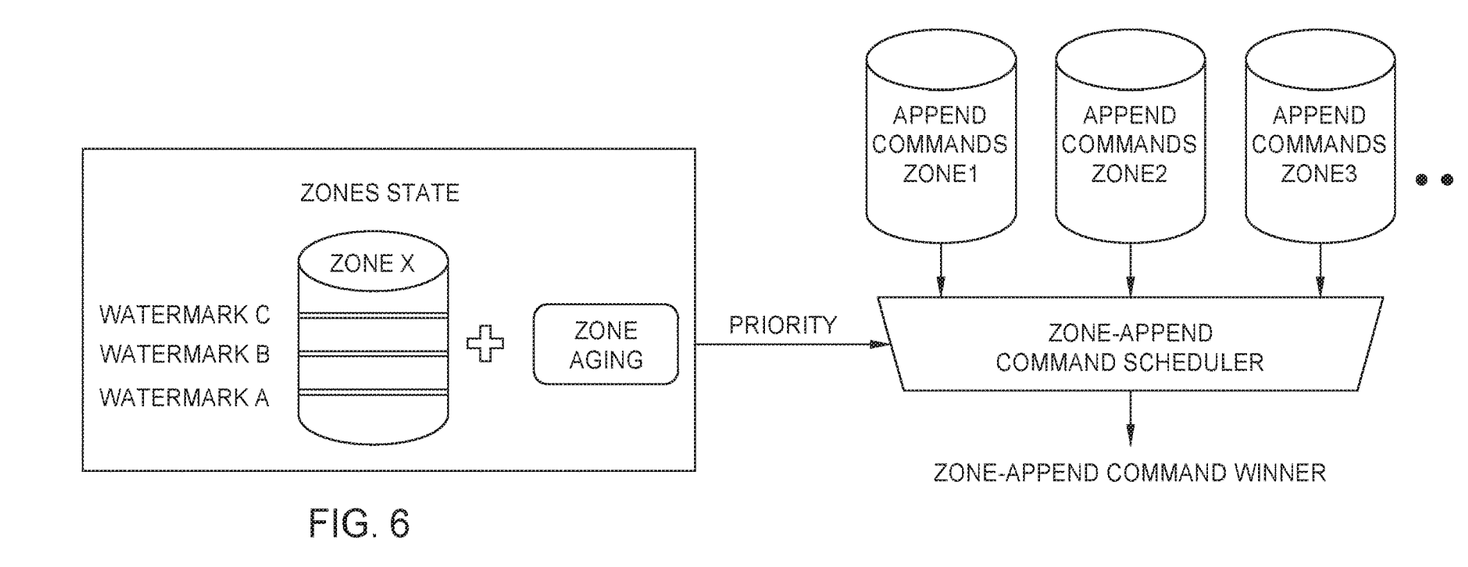
FIG. 6 is a schematic illustration of a zone-append command scheduler according to one embodiment.

FIG. 6 is a schematic illustration of a zone-append command scheduler according to one embodiment. Aspects of FIG. 5 may be similar to the schematic illustration of FIG. 6. In FIG. 6, multiple zones are open. The more parallel open zones in a storage device, the complexity of the zone-append command scheduler is greater. For example, each open zone has an XOR buffer and each open XOR buffer, generally, may not be stored in SRAM. The controller, such as the controller 108 of FIG. 1, may fold the XOR buffers into DRAM and NAND of the storage device, such as data storage device 106 of FIG. 1, in some scenarios. The zone-append command scheduler may be the zone-append command scheduler described in FIG. 5.

The zone-append command scheduler may operate on one or more criteria, such as zone fullness and zone aging, such that a zone that is more full and older has a higher priority than that of a zone that is less full and younger. Once a zone crosses a predetermined threshold, such as a zone age, a zone fullness, or both, the controller 108 closes the zone by filling the remaining space with pad data. By utilizing the priority rating of a zone, zones may be more quickly closed so that an accumulation of multiple open zones within the data storage device 106. The controller 108 recognizes the priority rating of the zone throughout the lifecycle of the zone. The lifecycle of the zone is characterized by the ZNS protocol described in FIG. 4. The zone-append command may be referred to as a command herein, for exemplary purposes. The controller honors the state of the zone during the command fetching phase. Furthermore, when selecting the next command in the execution phase, the state of the zone is further considered. When transferring either data or control messages associated with the zone-append commands, the state of the zone is considered in any arbitration stage.

The ZNS protocol allows the device, in specific conditions, to close an open zone or to put the zone in an offline state. In one embodiment, once the storage device detects that a zone is going to be in offline state, storage device will assign the relevant zone the highest priority rating and try to close the zone normally by executing zone-append commands associated with the relevant zone, so that the zone will be filled and closed without filling the zone with pad data.

The zone-append scheduler receives the status of all available commands associated with the zones and state of each zone. For instance, each zone receives a number of outstanding commands comprising commands held in the storage device for execution (i.e., a buffer), commands waiting for fetching from host, such as the host device 104 of FIG. 1, memory, commands waiting in the execution phase, and the like. The zone-append command scheduler receives the priority of each zone, which is based on the amount of available data in the zone and zone aging. Based on the zone information, the zone-append command scheduler determines the zone with the highest priority and attempts to schedule commands to close the zone. For example, if three zones, Zone1, Zone2, and Zone3, are open in the data storage device 106, the controller 108 determines the priority rating of each zone based on factors such as zone fullness and zone aging. If the priority rating of Zone3 is higher than that of Zone1 and the priority rating of Zone1 is higher than that of Zone2, then the zone-append command scheduler will first attempt to schedule commands to Zone3 to fill up the zone first, then Zone1 to fill up the zone second, and then Zone2 to fill up the zone third.

Figure 7:
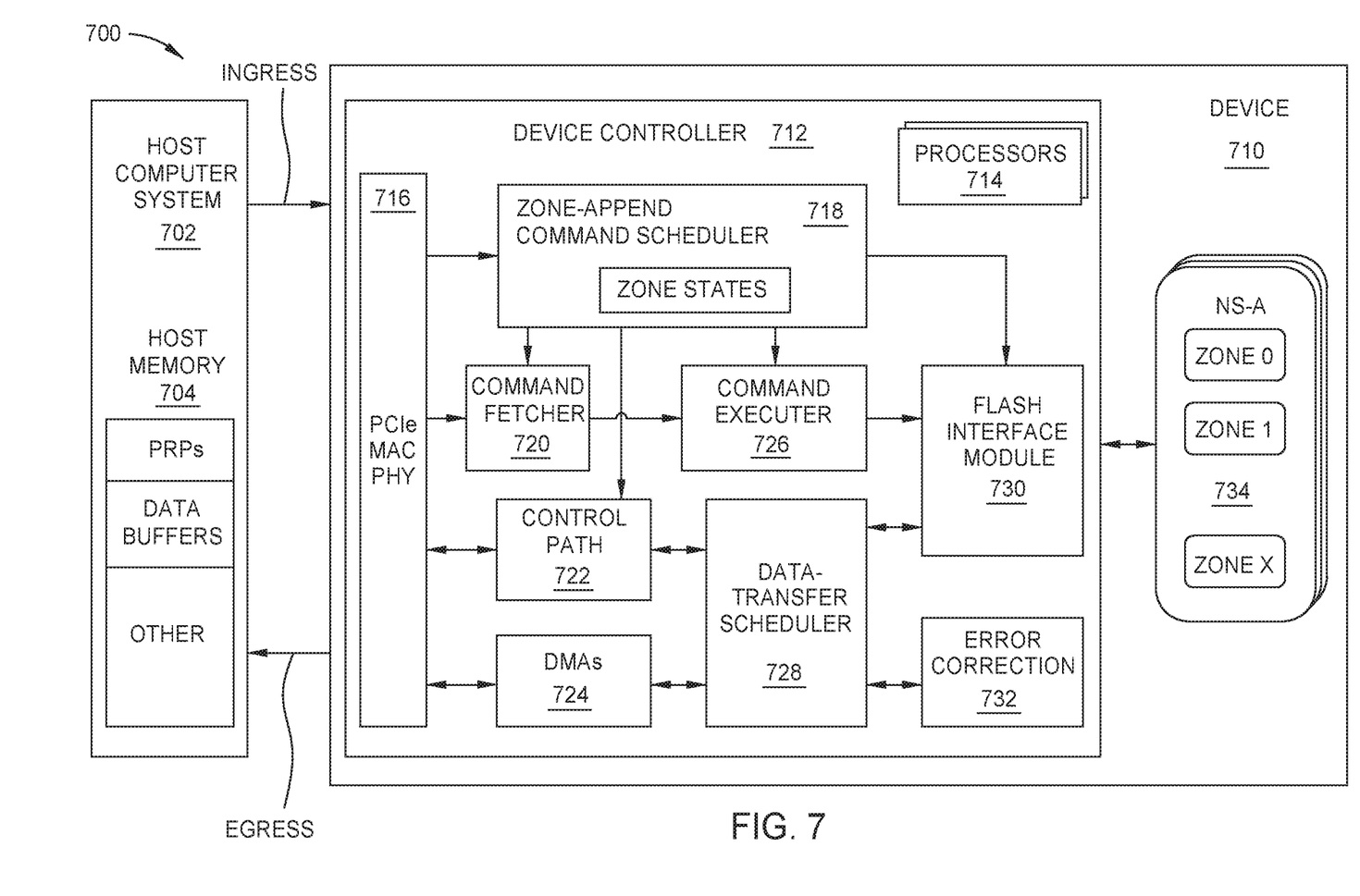
FIG. 7 is a schematic block diagram illustrating a storage system according to one embodiment.

FIG. 7 is a schematic block diagram illustrating a storage system 700 according to one embodiment. Aspects of the storage system 700 may be similar to the storage system 100 of FIG. 1. The host 702 may utilize non-volatile memory (NVM) 734 having zoned namespaces included in data storage device 710 to store and retrieve data effectively. Host 702 comprises a host memory 704 and an interface (not shown). Host 702 may include a wide range of devices, such as computer servers, network attached storage (NAS) units, desktop computers, notebook (e.g., laptops) computers, tablet computers (e.g., "smart" pads), mobile devices, set-top boxes, telephone handsets (e.g., "smart" phones), televisions, cameras, display devices, digital media players, video gaming consoles, video streaming devices, automotive applications (e.g., mapping, autonomous driving), or other devices capable of running one or more virtualized hosts. In certain embodiments, host 702 includes any device having a processing unit or any form of hardware capable of processing data, including a general purpose processing unit, dedicated hardware (such as an application specific integrated circuit (ASIC)), configurable hardware such as a field programmable gate array (FPGA), or any other form of processing unit configured by software instructions, microcode, or firmware. Host memory 704 is a device allowing information, such as executable instructions, cryptographic keys, configurations, and other data, to be stored and retrieved. Host memory 704 can be DRAM, virtual memory, other main memories, and combinations thereof. The host memory 704 comprises parallel redundancy protocols, data buffers, and other components.

The interface can be a network interface or a data storage device interface. Network interface enables host 702 to communicate with data storage device 710 via a communication medium. Network interface may be one or more network adapters, also referred to as Network Interface Cards (NICs). Data storage device interface enables host 702 to communicate with data storage device 710 via a dedicated link.

The host 702 interface interacts with a data storage device 710 interface for ingress and egress of communications between host 702 and data storage device 710. Data storage device 710 interface and host 702 interface operate under a communication protocol, such as a Peripheral Component Interface Express (PCIe) serial communication protocol or other suitable communication protocols. The interface includes one or more ports, such as a PCIe port, an RDMA port (Ethernet, RoCE/iWARP, InfiniBand), a fibre channel port, a TCP port, or other suitable fabric ports. Devices connected to the PCIe fabric direct communications to other devices by providing a PCIe address. The fabric routes such communications to the appropriate device based on the PCIe address. One portion of the address is a device number that specifies the physical device to which a communication is to be routed.

Host 702 and data storage device 710 can communicate over the PCIe interface through NVMe communications. NVMe communications can be by one or more of NVMe over PCIe fabrics, NVMe over non-PCIe fabrics, and/or local PCIe. NVMe over non-PCIe fabrics includes a transport abstraction layers at both sides of the fabric interfaces to translate native PCIe transactions over non-PCIe fabrics. Host 702 can be connected to the data storage device 710 over a data center storage system network, an enterprise storage system network, a storage area network, a cloud storage network, a local area network (LAN), a wide area network (WAN), the Internet, other networks, wired links, wireless links, and interconnections thereof.

Data storage device 710 may be a network storage device, an internal storage drive (e.g., server computer, desktop hard drive, notebook computer), a data center storage device, an external storage device, an embedded mass storage device, a removable mass storage device, and other suitable data storage devices.

Data storage device 710 includes a storage device controller 712 which manages operations of data storage device 710, such as writes to and reads from a zoned namespace of a NVM 734 comprising ZNS protocol, described in FIG. 5. The term NVM used herein may refer to the NS-A individually or to the one or more non-volatile memory units within the data storage device 710 for exemplary purposes. Each namespace comprises one or more zones, such as Zone 0 and Zone 1. Storage device controller 712 may include one or more processors 714, which may be multi-core processors. Processor 714 handles the components of data storage device 710 through firmware and/or software. Processor 714 executes instructions of the computer-readable program code of the firmware and/or software. Storage device controller 712 implements the processes described herein by execution of instructions by the processor 714, by hardware, or by combinations thereof. Hardware can include various components of storage device controller 712, such as logic gates, switches, application specific integrated circuits (ASICs), programmable logic controllers, embedded microcontrollers, registers, and other components.

Storage device controller 712 may operate under the NVMe protocol, but other protocols are applicable. The NVMe protocol is a communications interface/protocol developed for SSDs to operate over a host and storage device linked over a PCIe interface. NVMe protocol provides a command queue and completion path for access of data stored in data storage device 710 by host 702.

The NVM 734 of data storage device 710 may be configured for long-term storage of information as non-volatile memory space and retains information after power on/off cycles. NVM 734 may consist of one of more dies of NAND flash memory. Other examples of non-volatile memory include phase change memories, ReRAM memories, MRAM memories, magnetic media (including shingle magnetic recording), optical disks, floppy disks, electrically programmable read only memories (EPROM), electrically erasable programmable read only memories (EEPROM), and other solid-state memories. Magnetic media non-volatile memory may be one or more magnetic platters in data storage device 710. Each platter may contain one or more regions of one or more tracks of data. NVM 734 may include one or more types of non-volatile memory.

Data storage device 710 may also include other components, such as a flash interface module 730, a zone-append command scheduler 718, an error correction module 732, a command fetcher 720, a command executor 726, and a control path 722. The storage device controller 712 may utilize the flash interface module 730 to interact with NVM 734 for read and write operations. DMA module 724 executes data transfers between host 702 and data storage device 710 without involvement from a host 702 CPU. Data transfer scheduler 728 controls the data transfer while activating the control path for fetching physical page regions (PRPs), posting completion and interrupts, and activating the DMAs for the actual data transfer between host 702 and data storage device 710. Error correction module 732 corrects the data fetched from the memory arrays. Command fetcher 720 parses commands to command executor 726 for execution on flash interface module 730. The zone-append command scheduler 718 may be the zone-append scheduler of FIG. 5 and FIG. 6, where the zone-append command scheduler receives the status of all available commands associated with the zones and state of each zone with a relevant available command.

Figure 8:
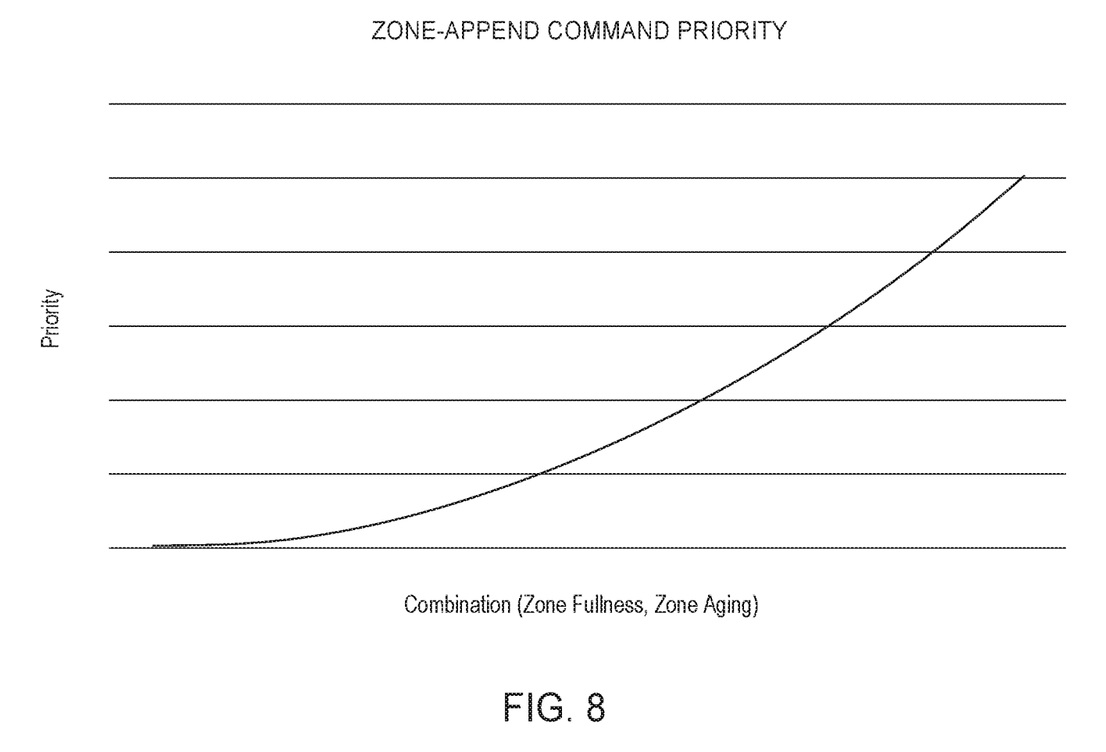
FIG. 8 is a graph illustrating zone-append command priority based on zone state.

FIG. 8 is a graph illustrating zone-append command priority based on zone state. Aspects of FIG. 4, FIG. 5, FIG. 6, and FIG. 7 may be relevant in the description of FIG. 8. The priority of the command increases based on the state of the open zone. The state of the open zone includes the fullness of the zone and the zone age. For example, a higher priority zone comprises more data and will be filled with data before that of zones with less data. As illustrated in FIG. 8, the combination of zone fullness and zone aging when compared to priority has an exponential relationship. As a zone ages and becomes filled with data, the zone has a higher likelihood to accumulate an unacceptable amount of bit errors, which may corrupt the current data or render the data stored in the zone unavailable. The zone-append command scheduler allows for the efficient management of zones in order to minimize the number of parallel open zones and shorten the average lifespan of the zones to increase the endurance of each zone through program/erase cycles.

By determining a priority for open zones in a ZNS environment, zone-append commands can be scheduled to maximize the number of zones that close due to fullness rather than for aging.

In one embodiment, a data storage device comprises: a memory device; and a controller coupled to the memory device, wherein the controller is configured to: determine a status of at least one zone in a zone namespace (ZNS) environment; determine an age of the at least one zone in the ZNS environment; calculate a priority for the at least one zone based upon the determined status and the determined age; and process zone-append commands based upon the calculated priority. The status of the at least one zone is a fullness of the at least one zone. The controller is configured to determine a status, determine an age, and calculate a priority for all open zones of the ZNS environment. The controller is configured to process zone-append commands in order of priority from high priority to low priority. The controller comprises a zone-append command scheduler. The controller is further configured to send the calculated priority to the zone-append command scheduler. Calculating the priority comprises adding together the determined status and the determined age. The controller is configured to determine the status, determine the age, and calculate the priority prior to fetching data from a host device.

In another embodiment, a data storage device comprises: a memory device; and a controller coupled to the memory device, wherein the controller comprises: a command fetcher; a command executor; a flash interface module coupled to the memory device; and a zone-append command scheduler coupled to the command fetcher, the command executor, and the flash interface module. The zone-append command scheduler monitors an age of each zone in a zone namespace (ZNS) environment. The zone-append command scheduler monitors a status of each zone in the ZNS. The zone-append command scheduler is configured to instruct the command fetcher to fetch commands for the zones based upon a calculated priority for each zone. The calculated priority for each zone is based upon an age of each zone and a status of each zone. The zone-append command scheduler is configured to provide a higher priority to zone-append commands to be written to a zone that has a longer period of time open compared to another zone. The zone-append command scheduler is configured to provide a higher priority to zone-append commands to be written to a zone that is closer to being full as compared to another zone.

In another embodiment, a data storage device comprises: a memory device; a controller coupled to the memory device; and means to schedule zone-append commands based upon an age of open zones and a fullness of open zones in a zone namespace (ZNS) environment. The data storage device further comprises means to determine an age of all open zones. The data storage device further comprises means to determine an age of all open zones. The data storage device further comprises means to instruct a command fetcher to fetch commands in accordance with instructions from the means to schedule. The data storage device further comprises means to monitor zone states of all open zones.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device;
a controller coupled to the memory device; and
means to schedule zone-append commands based upon an age of at least one open zone and a fullness of the at least one open zone in a zone namespace (ZNS) environment, wherein the fullness is less than a total capacity of the at least one open zone, wherein the zone-append commands contain a same address as the at least one open zone in the ZNS environment, wherein a priority is calculated based upon the age of the at least one open zone and the fullness of the at least one open zone, and wherein the calculated priority of the at least one open zone is higher than a calculated priority of another open zone in the ZNS environment, the zone-append commands of the at least one open zone are scheduled before other zone-append commands of the another open zone, the at least one open zone is filled prior to the at least one open zone being closed, and the calculated priority increases when the age increases or the fullness increases.

2. The data storage device of claim 1, further comprising means to determine an age of all open zones.

3. The data storage device of claim 1, further comprising means to instruct a command fetcher to fetch commands in accordance with instructions from the means to schedule.

4. The data storage device of claim 1, further comprising means to monitor zone states of all open zones.

5. A data storage device, comprising:
a memory device; and
a controller coupled to the memory device, wherein the controller is configured to:

determine a fullness of at least one open zone in a zone namespace (ZNS) environment, wherein the fullness is less than a total capacity of the at least one open zone;

determine an age of the at least one open zone in the ZNS environment;

calculate a priority for the at least one open zone based upon the determined fullness and the determined age; and process zone-append commands for the at least one open zone based upon the calculated priority, wherein the zone-append commands contain a same address as an open zone of the at least one open zone in the ZNS environment, wherein the calculated priority of the at least one open zone is higher than a calculated priority of another open zone in the ZNS environment, the zone-append commands of the at least one open zone are scheduled before other zone-append commands of the another open zone, the at least one open zone is filled prior to the at least one open zone being closed, and the calculated priority increases when the determined age increases or the determined fullness increases.

6. The data storage device of claim 5, wherein the controller is configured to determine the fullness, determine the age, and calculate the priority for all open zones of the ZNS environment.

7. The data storage device of claim 6, wherein the controller is configured to process the zone-append commands in order of priority from a high priority to a low priority.

8. The data storage device of claim 5, wherein the controller comprises a zone-append command scheduler.

9. The data storage device of claim 8, wherein the controller is further configured to send the calculated priority to the zone-append command scheduler.

10. The data storage device of claim 5, wherein calculating the priority comprises adding together the determined fullness and the determined age.

11. The data storage device of claim 5, wherein the controller is configured to determine the fullness, determine the age, and calculate the priority prior to fetching data from a host device.

12. A data storage device, comprising:
a memory device; and
a controller coupled to the memory device, wherein the controller comprises:
a command fetcher;
a command executor;
a flash interface module coupled to the memory device; and
a zone-append command scheduler coupled to the command fetcher, the command executor, and the flash interface module, wherein the zone-append command scheduler is configured to:
receive a zone-append command, wherein:
the zone-append command is based on a calculated priority;
the calculated priority is based on a fullness of at least one open zone and an age of the at least one open zone;
the fullness is less than a total capacity of the at least one open zone; and
the zone-append command contains a same address as the at least one open zone in a zone namespace (ZNS) environment; and
process the zone-append command for the at least one open zone based upon the calculated priority, wherein the calculated priority of the at least one open zone is higher than a calculated priority of another open zone in the ZNS environment, the zone-append command of the at least one open zone is scheduled before other zone-append commands of the another open zone, the at least one open zone is filled prior to the at least one open zone being closed, and the calculated priority increases when the age increases or the fullness increases.

13. The data storage device of claim 12, wherein the zone-append command scheduler monitors an age of each zone in a zone namespace (ZNS) environment.

14. The data storage device of claim 13, wherein the zone-append command scheduler monitors a fullness of each zone in the ZNS environment.

15. The data storage device of claim 12, wherein the zone-append command scheduler is configured to instruct the command fetcher to fetch commands for each of zones based upon a calculated priority for each of the zones.

16. The data storage device of claim 15, wherein the calculated priority for each of the zones is based upon an age of each of the zones and a fullness of each of the zones.

17. The data storage device of claim 12, wherein the zone-append command scheduler is configured to provide a higher priority to zone-append commands to be written to a zone that has a longer period of time open compared to another zone.

18. The data storage device of claim 12, wherein the zone-append command scheduler is configured to provide a higher priority to zone-append commands to be written to a zone that is closer to being full as compared to another zone.

* * * * *